US011989613B1

(12) United States Patent
Larsson

(10) Patent No.: US 11,989,613 B1
(45) Date of Patent: May 21, 2024

(54) PRODUCT LIFE CYCLE AND AUTHENTICATION

(71) Applicant: WHATT.IO INTELLECTUAL PROPERTY, LLC, Carlsbad, CA (US)

(72) Inventor: Stefan Larsson, Hollviken (SE)

(73) Assignee: WHATT.IO INTELLECTUAL PROPERTY, LLC

( * ) Notice: Subject to any disclaimer, the term of this patent is extended or adjusted under 35 U.S.C. 154(b) by 0 days.

(21) Appl. No.: 17/987,607

(22) Filed: Nov. 15, 2022

(51) Int. Cl.
*G06K 7/10* (2006.01)
(52) U.S. Cl.
CPC ................................ *G06K 7/10297* (2013.01)
(58) Field of Classification Search
CPC . G06K 7/10297; G06K 19/0723; G06Q 30/18
USPC ........................................................ 235/451
See application file for complete search history.

(56) References Cited

U.S. PATENT DOCUMENTS

| | | | | |
|---|---|---|---|---|
| 8,706,588 | B1 * | 4/2014 | Zhu | G06Q 20/3265 705/38 |
| 2019/0197518 | A1 * | 6/2019 | Puehse | G06Q 20/3278 |
| 2021/0248653 | A1 * | 8/2021 | McKenzie | G06F 21/44 |
| 2023/0010248 | A1 * | 1/2023 | Barhudarian | H04W 12/108 |
| 2023/0031817 | A1 * | 2/2023 | Mulas | G07G 1/0054 |
| 2023/0070289 | A1 | 3/2023 | Kim et al. | |
| 2023/0070389 | A1 * | 3/2023 | Madhusudhan | G06Q 20/3276 |

OTHER PUBLICATIONS

International Search Report and Written Opinion for PCT/US2023/079531 mailed Dec. 28, 2023.

* cited by examiner

*Primary Examiner* — Ahshik Kim
(74) *Attorney, Agent, or Firm* — Sandberg Phoenix & von Gontard P.C.

(57) ABSTRACT

An authentication system for authenticating an asset having an NFC tag is disclosed comprising an authentication server, a controller in communication with the authentication server and an NFC enabled device, the controller is configured to request reading of a tag identification number (ID) from a memory of the NFC tag, generate a tag record of the NFC tag on the authentication server, associated with the tag ID, generate a token (TS) corresponding to the NFC tag, the token is generated by an algorithm based on the tag ID, request writing of the token to the memory, associate the token with the tag ID, wherein, upon a user subsequently validating the asset, the controller is configured to request reading the token from the memory, and verify the token against the tag record comprising comparing said token with the associated token stored in the tag record on the authentication server.

15 Claims, 8 Drawing Sheets

PRODUCT LIFE CYCLE AND AUTHENTICATION

TECHNICAL FIELD

The present disclosure relates generally to the field of product life cycle management and authentication. More particularly, the present disclosure relates to an authentication system for authenticating an asset having an associated Near Field Communication (NFC) tag and a related method.

BACKGROUND

The product life cycle from the manufacturing to the end user becomes increasingly more important from a sustainability perspective and for overall resource optimization. The traceability of a product is a factor that affects how well the aforementioned life cycle can be optimized and understood. This in turn is dependent on how reliably the identity of a particular product item can be determined. A product which can be reliably identified facilitates post-production processes and can provide feedback to the manufacturing as well as provide valuable insight in waste streams at the end of the life cycle. Besides being able to validate the authenticity of a product the end user can reliably maintain manufacturer services via the validated product ID, e.g. for upgrades, receiving spare parts, etc. Manufacturers may in turn grow their offering to end users with such utilization of product traceability and authentication. Previous attempts to provide product authentication are typically associated with complex or sub-optimal implementation of RFID/NFC technologies that are often not viable for the product type or failing to provide secure traceability over the full life cycle. NFC (Near field communication) tags have been adopted in a variety of products and other contexts to provide a heightened level of interactivity. As the NFC technology becomes more widely adopted, however, the opportunity for exploitation increases. Malicious parties may replace or rewrite existing NFC tags to carry instructions or other data intended to scam or attack the party reading the tag. NFC is a set of communication protocols for electronic devices that enables communication between the devices by bringing the devices together in close contact. An NFC enabled device, such as a mobile phone, functions as an initiator and generates a radio frequency field to power a passive target, i.e. the 'tag' which is attached to the product to be identified. The tag generally includes a microchip that is capable of storing information for transfer to the initiator. The tag may be associated with an asset for authentication of the asset. However, in various fields of application, e.g. in a supply chain, the NFC standard may not ensure secure communication between the tag of the asset and the initiator in that the NFC standard may not prevent various security attacks that may occur at some point along the supply chain.

SUMMARY

It is an objective of the disclosure to at least partly overcome one or more of the above-identified limitations of the prior art.

One objective is to provide an improved life cycle management of product items.

Another objective is to provide a reliable and facilitated authentication of a product.

One or more of these objectives, and other objectives that may appear from the description below, are at least partly achieved by means of an authentication system for authenticating an asset having an associated Near Field Communication (NFC) tag, and a related method, according to the independent claims, embodiments thereof being defined by the dependent claims.

According to a first aspect an authentication system for authenticating an asset is provided having an associated Near Field Communication (NFC) tag, the authentication system comprising an authentication server, a controller in communication with the authentication server and an NFC enabled device configured to read and write data to a memory of the NFC tag, wherein the controller is configured to request reading of a tag identification number (ID) from the memory of the NFC tag, when an NFC connection is established between the NFC enabled device and the NFC tag, generate a tag record of the NFC tag on the authentication server, associated with the tag ID, generate a token (TS) corresponding to the NFC tag, wherein the token is generated by an algorithm based on the tag ID, request writing of the token to the memory of the of the NFC tag, when an NFC connection is established between the NFC enabled device and the NFC tag, associate the token with the tag ID in the tag record of the NFC tag, wherein, upon a user subsequently validating the asset, the controller is configured to request reading the token from the memory, such as by the NFC enabled device or a user device configured for NFC read-only communication, and verify the token against the tag record for the tag ID comprising comparing said token with the associated token stored in said tag record on the authentication server.

According to a second aspect a method for authenticating an asset having an associated Near Field Communication (NFC) tag is provided, the method comprising reading a tag identification number (ID) from a memory of a Near Field Communication (NFC) tag, when an NFC connection is established between an NFC enabled device and the NFC tag, generating a tag record of the NFC tag on an authentication server, associated with the tag ID, generating a token (TS) corresponding to the NFC tag based on the tag ID, writing of the token to the memory of the of the NFC tag, when an NFC connection is established between the NFC enabled device and the NFC tag, associating the token with the tag ID in the tag record of the NFC tag, wherein, upon a user subsequently validating the asset, the method comprises reading the token from the memory, such as by the NFC enabled device or a user device configured for NFC read-only communication, and verifying the token against the tag record for the tag ID comprising comparing said token with the associated token stored in said tag record on the authentication server.

According to a third aspect a computer program product is provided which, when the program is executed by a computer, causes the computer to carry out the steps of the method according to the second aspect.

Further examples of the disclosure are defined in the dependent claims, wherein features for the first aspect may be implemented for the second and subsequent aspects, and vice versa.

Some examples of the disclosure provide for an improved life cycle management of a product.

Some examples of the disclosure provide for facilitated tracking of a product over its life cycle.

Some examples of the disclosure provide for a reliable and facilitated authentication of a product.

Some examples of the disclosure provide for more reliable NFC communication with a product.

Some examples of the disclosure provide for a facilitated utilization and management of a digital twin of a product.

Some examples of the disclosure provide for reliably managing ownership of a product.

Some examples of the disclosure provide for a facilitated and secure communication of product information to an end user.

Some examples of the disclosure provide for facilitated customization of product information to an end user throughout the product life cycle.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the disclosure are capable of will be apparent and elucidated from the following description of examples of the present disclosure, reference being made to the accompanying schematic drawings, in which.

DETAILED DESCRIPTION

Figure 1:
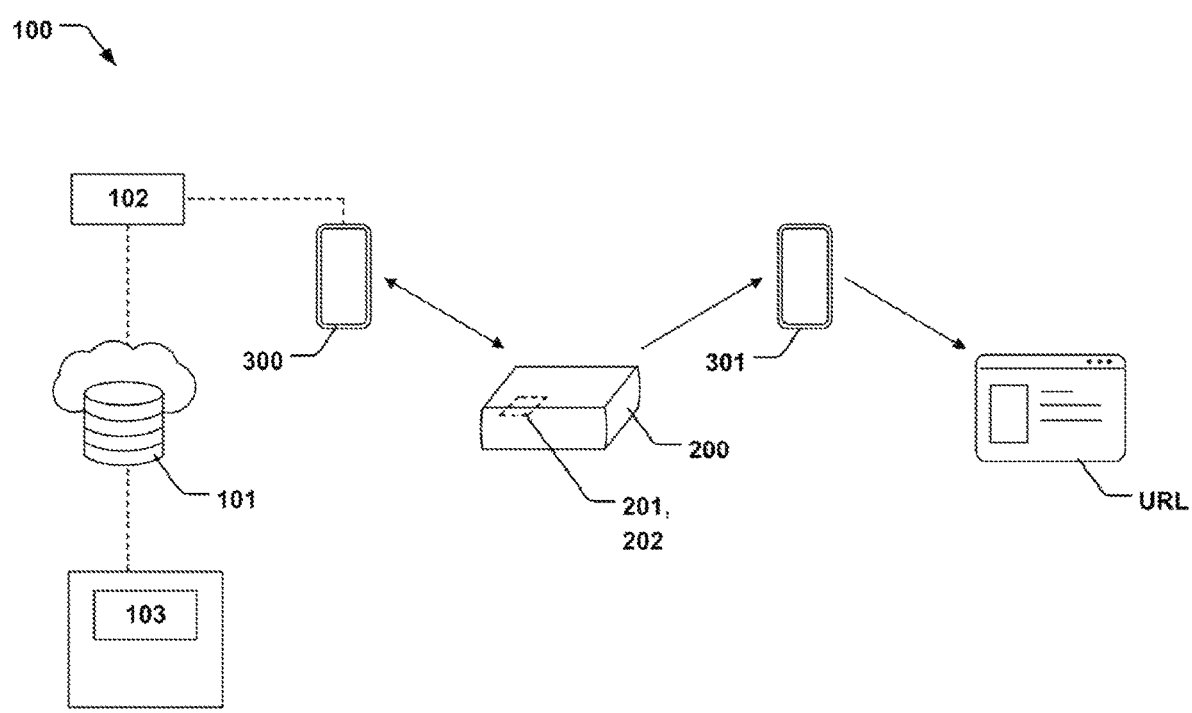
FIG. 1 shows a schematic illustration of an authentication system for authenticating an asset, according to an example.

Specific examples of the disclosure will now be described with reference to the accompanying drawings. This disclosure may, however, be embodied in many different forms and should not be construed as limited to the examples set forth herein; rather, these examples are provided so that this disclosure will be thorough and complete, and will fully convey the scope of the disclosure to those skilled in the art. The terminology used in the detailed description of the examples illustrated in the accompanying drawings is not intended to be limiting of the disclosure. In the drawings, like numbers refer to like elements.

FIG. 1 is a schematic illustration of an authentication system 100 for authenticating an asset 200. The asset 200 may be consumer products, or any other manufactured item to be reliably identified, such as machine parts, building parts etc. The asset 200 has an associated Near Field Communication NFC tag 201. The NFC tag 201 is referred to as a tag 201 in the disclosure for brevity. The asset 200 may be formed by additive manufacturing, such as by 3D printing, where layer upon layer of material sequentially added to form the 3D object. The asset 200 may be a 3D printed device with the NFC tag 201 embedded in the printed material of the asset 200. The tag 201 may thus be integrated and hidden inside the asset 200 in some examples of the disclosure. The authentication system 100 comprises an authentication server 101 as schematically shown in FIG. 1. The authentication system 100 comprises a controller 102 in communication with the authentication server 101 and an NFC enabled device 300. The NFC enabled device 300 may communicate wirelessly with the authentication server 101 via the controller 102. The NFC enabled device 300 is configured to read and write data to a memory 202 of the tag 201. The NFC enabled device 300 may be an NFC enabled smartphone or tablet in one example.

Figure 2A:
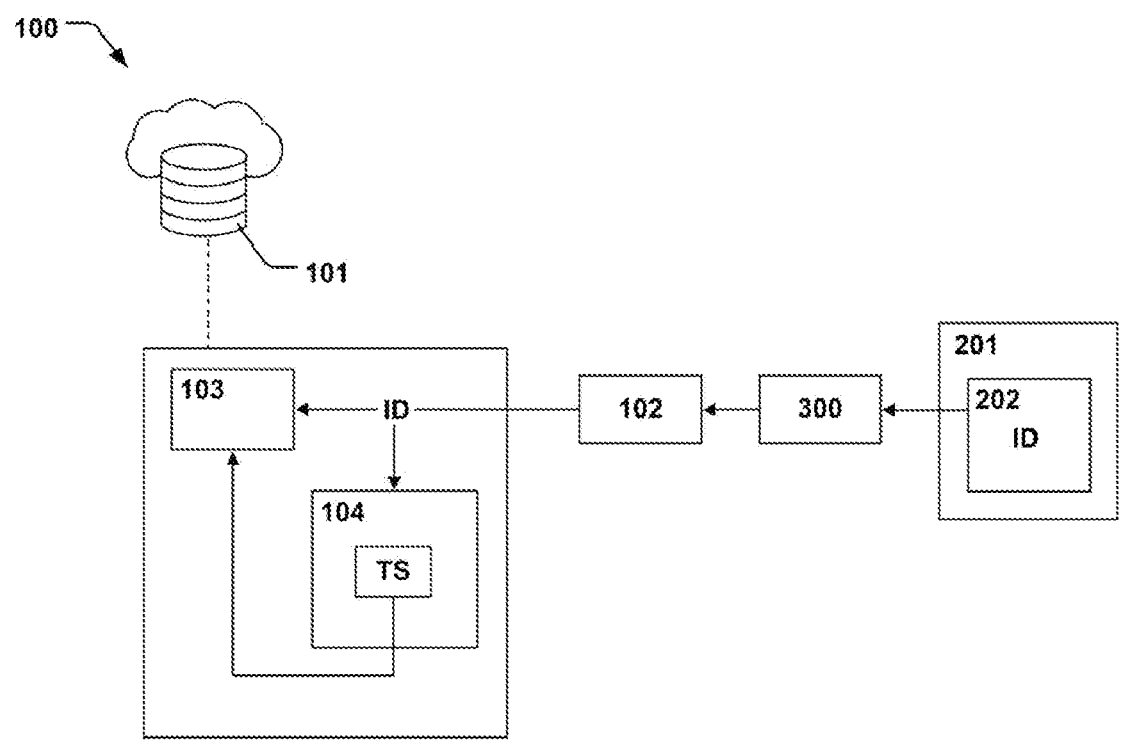
FIGS. 2a-c show schematic illustrations of an authentication system for authenticating an asset, according to an example, where a tag identification number (ID) is read from the memory of an NFC tag and a tag record is generated in an authentication server (a); a token (TS) is generated based on the tag (ID) and is written to the memory of the NFC tag (b); the token in the memory of the NFC tag is verified against the tag record (c)

The controller 102 is configured to request reading of a tag identification number (ID) from the memory 202 of the tag 201, when an NFC connection is established between the NFC enabled device 300 and the tag 201. The tag identification number (ID) is referred to as the tag ID in the disclosure for brevity. The controller 102 is configured to generate a tag record 103 of the tag 201 on the authentication server 101, so that the tag record 103 is associated with the tag ID. FIG. 2a is a schematic illustration of the tag ID being read from the memory 202 by the NFC enabled device 300, and the tag record 103 associated with the tag ID being generated, via the controller 102. The controller 102 is configured to generate a token (TS) corresponding to the NFC tag 201. The token (TS) is generated by an algorithm 104 based on the tag ID which has been read from the tag 201. The controller 102 may be configured to instruct the algorithm 104 to generate the token (TS), and the algorithm 104 may run on the authentication server 101 in one example. The algorithm 104 receives the token ID as input, comprising a plurality of characters, such as a plurality of numbers, letters, and/or symbols, and generates the token (TS) as output, which is a different set of characters, such as a plurality of numbers, letters, and/or symbols. The token (TS) may comprise at least 32 characters in one example. The token (TS) can be generated based on a rule set defined in the algorithm 104. The algorithm 104 may comprise an encryption algorithm.

Figure 2B:
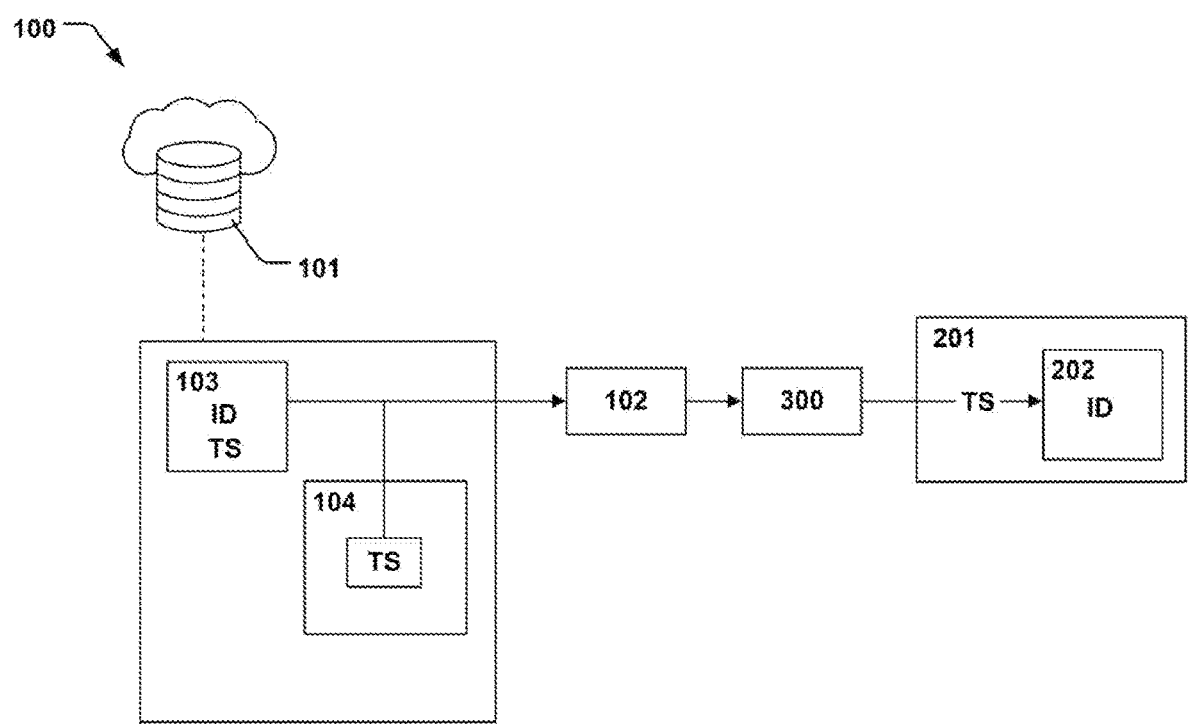

The controller 102 is configured to request writing of the token (TS) to the memory 202 of the tag 201, when an NFC connection is established between the NFC enabled device 300 and the tag 201. FIG. 2b is a schematic illustration of the generated token (TS) being communicated to the NFC enabled device 300 and written to the memory 202 via the controller 102. The tag 201 may be locked from further writing to the memory 202 thereof. The controller 102 is configured to associate the token (TS) with the tag ID in the tag record 103 of the tag 201. The token (TS) is thus also stored in the tag record 103 of the tag 201, as schematically indicated in FIG. 2b. The tag 201 has thus been assigned a new digital identity with the token (TS) which uniquely links the tag 201 of the asset 200 with the corresponding tag record 103 in the authentication server 101, in a highly efficient, robust and secure manner.

Figure 2C:
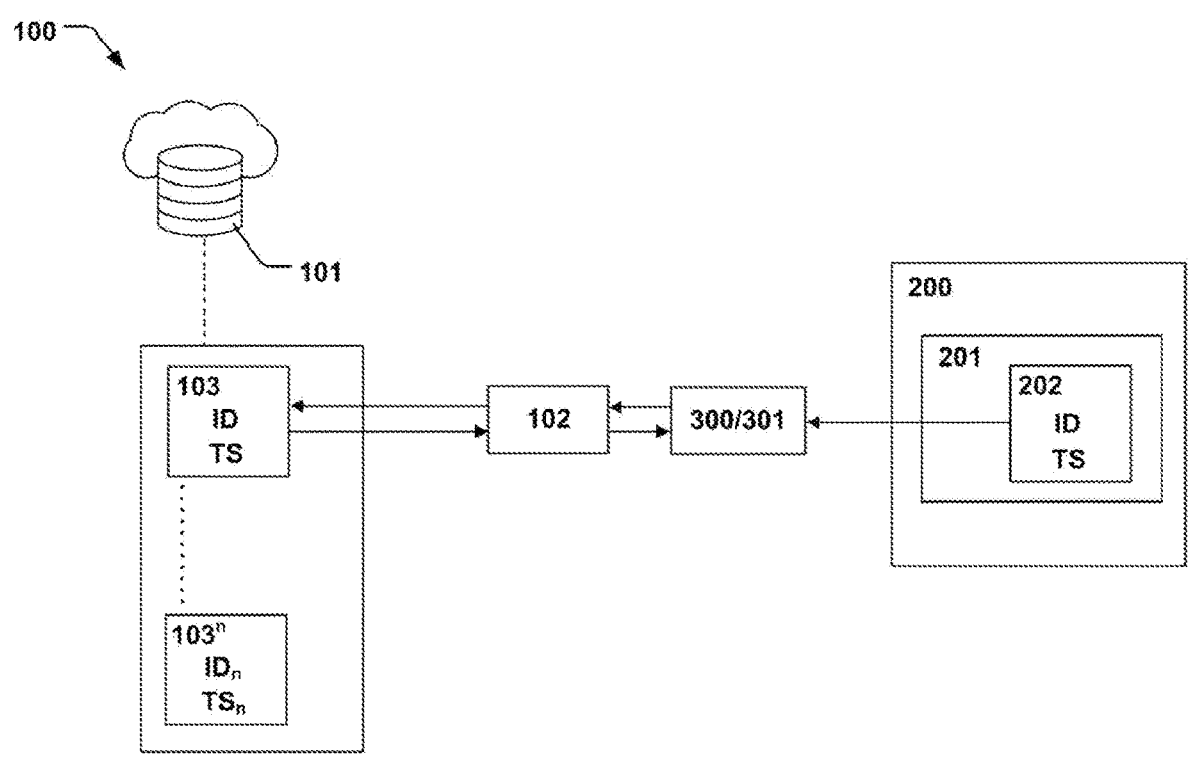

A user may thus subsequently validate the authenticity of the asset 200. The controller 102 is configured, upon such authentication, to request reading the token (TS) from the memory 202, such as by the NFC enabled device 300 or another user device 301, as schematically indicated in FIG. 1. The user device 301 may be configured for NFC read-only communication. Hence, in one example, the token (TS) may be generated and stored as described above via the NFC enabled device 300 by a manufacturer, while the subsequent check of the authenticity may be done by a consumer having user device 301, such as an NFC enabled smartphone or tablet. A consumer or other end user may need to be assigned the required user rights to be enabled to validate the authenticity of the asset 200. FIG. 2c is a schematic illustration of the token (TS) being read from the memory 202 of the tag 201 by any of the aforementioned NFC enabled devices 300, 301. The token (TS) being read from the memory 202 is communicated to the controller 102. The controller 102 is configured to verify the token (TS) read from memory 202 against the tag record 103 for the tag ID of the tag 201. The controller 102 is thus configured to verify the token (TS) comprising comparing said token (TS), received from the memory 202 of the tag 201, with the associated token (TS) stored in the tag record 103 on the authentication server 101 under the tag ID of the tag 201, as schematically indicated in FIG. 2c. The authentication server 101 may store a plurality (n) of tag records 103 . . . $103^n$, associated with a respective plurality of tags 201 and their respective tag ID (ID . . . $ID_n$). Each tag record $103^n$, may thus store a corresponding token $TS_n$, associated with the tag ID ($ID_n$). Generating a unique token (TS) as described above based on the tag ID for verification at an authentication server 101 allows for a manufacturer or other user to label the asset 200 with a unique identity irrespectively of what particular serial number, i.e. tag ID, the NFC tag 201 may have. This prevents attempts to manipulate the identity of the tag 201, such as in attempts to provide counterfeit products. A secure digital 'twin' of the asset 200 may be upheld on the authentication server 101, linked to the physical asset 200 via the generated token (TS). Such digital twin may serve as a reliable record of the asset 200, and may be continuously updated with product information throughout its life cycle. End users can reliably maintain manufacturer services, e.g. for upgrades, receiving spare parts, etc. The tag record 103 being linked to a particular asset 200 may for example comprise manufacturing data for on-demand production of related components. Data for 3D printing of such components may be downloaded by a user and sent to a local 3D printing facility. Manufacturers may continuously provide updated and customized data to the user of the authenticated asset 200 via the secure tag record 103. The tag record 103 may also serve as a ledger for maintaining ownership data of the asset 200. Transactions and change of ownership may thus be recorded on the authentication server 101 in a secure manner. The improved traceability of the asset 200 may also be advantageous at the end of the life cycle where waste streams can be more reliably traced.

The controller 102 may be configured to determine that the asset 200 is authentic if the token (TS) stored in the tag record 103 for the tag ID is equivalent to the token (TS) stored in the memory 202 of the tag 201 having the aforementioned tag ID. Hence, as the user device 300, 301, reads the tag ID and token (TS) from a particular tag 201, the controller 102 is configured to check the corresponding tag ID in the tag record 103, and compare the token (TS) retrieved from the memory 202 with the token (TS) stored in the tag record 103 for the tag ID. The controller 102 may be configured to send a notification to the NFC enabled device 300 and/or a user device 301 that the asset is authentic based on the determining that the token (TS) stored in the memory 202 and in the tag record 103 matches. Analogously, the controller 102 may be configured to send a notification to the NFC enabled device 300 and/or a user device 301 that the asset 200 is not authentic based on the determining that the token (TS) stored in the memory 202 and in the tag record 103 is a non-match.

Figure 3A:
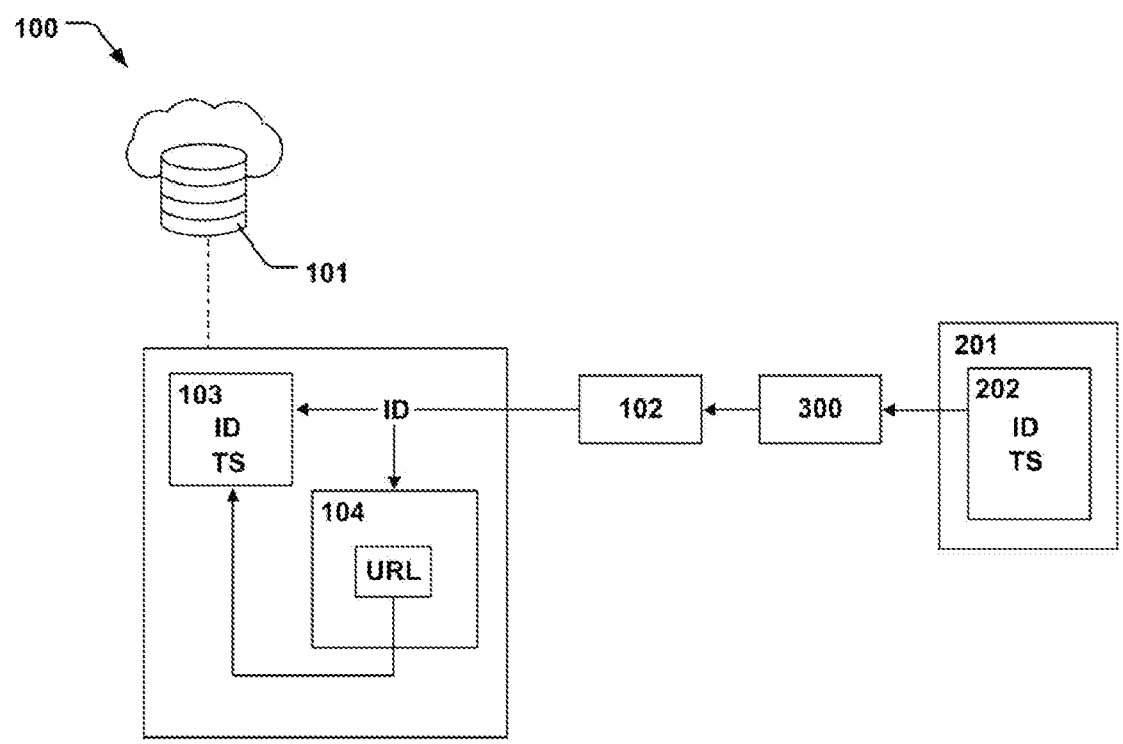
FIGS. 3a-c show schematic illustrations of an authentication system for authenticating an asset, according to an example, where a tag identification number (ID) is read from the memory of an NFC tag and a tag record is generated in an authentication server (a); an URL is generated based on the tag (ID) and is written to the memory of the NFC tag (b); the URL and the token in the memory of the NFC tag is verified (c)

The controller 102 may be configured to generate a tag URL for the NFC tag 201 based on the tag ID. FIG. 3a is a schematic illustration of the tag ID being read from the memory 202 of the tag 201, and the URL being generated based on the tag ID, via the controller 102. The controller 102 may be configured to instruct an algorithm 104 to generate the tag URL and the algorithm 104 may run on the authentication server 101 in one example. The algorithm 104 may generate the tag URL and the token (TS) as described above. It should be understood however that the tag URL may be generated according to a different rule set, and thus by a separate algorithm, although indicated with the same reference numeral 104 in the example of FIG. 3a as in the examples described with reference to FIGS. 2a-c.

Figure 3B:
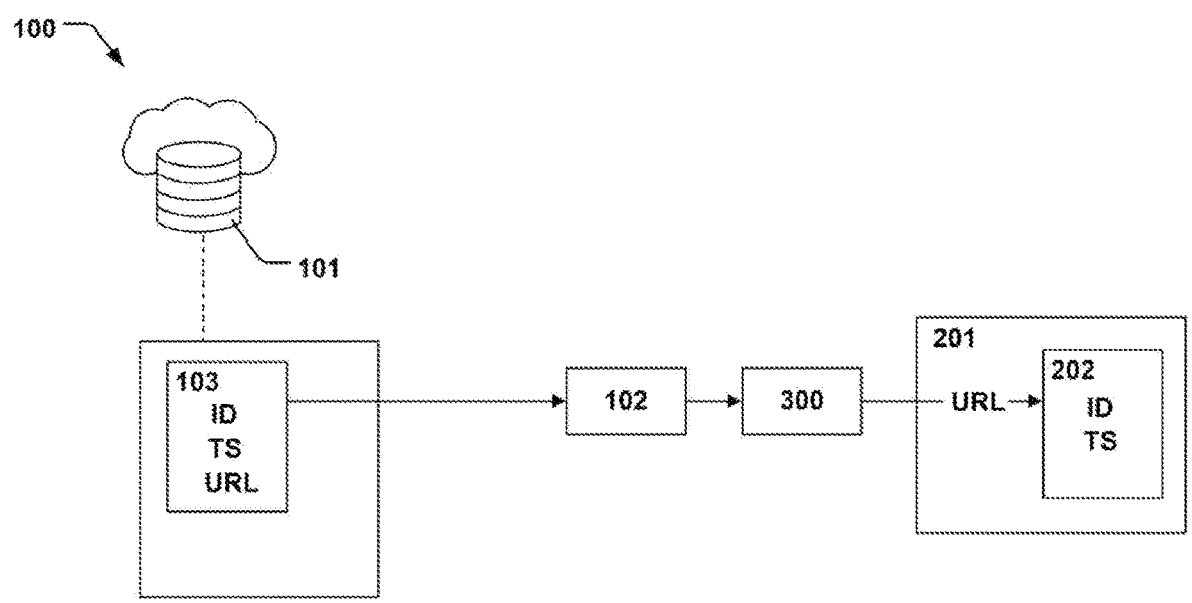

The controller 102 may be configured to request writing of the tag URL to the memory 202 of the tag 201, when an NFC connection is established between the NFC enabled device 300 and the tag 201. FIG. 3b is a schematic illustration of the generated tag URL being communicated to the NFC enabled device 300 and written to the memory 202 via the controller 102. The memory 202 may accordingly store both the token (TS) as described above and the tag URL. The controller 102 may be configured to associate the tag URL with the tag ID in the tag record 103 of the tag 201, as schematically indicated in FIG. 3b. A user having an NFC enabled device 301 may accordingly be directed to the URL as defined in the tag URL when reading the tag 201, as schematically illustrated in FIG. 1. The aforementioned URL and associated data downloadable by the user of device 301 may be managed via the authentication server 101 and the controller 102, e.g. via an interface on the NFC enabled device 300 (FIG. 1) which may be controlled by the manufacturer. The manufacturer may thus continuously monitor and manage the content of the URL accessed by the user device 301, e.g. to keep product information of the authenticated asset 200 up to date or to provide other customized product services to an end user throughout the product life cycle.

Figure 3C:
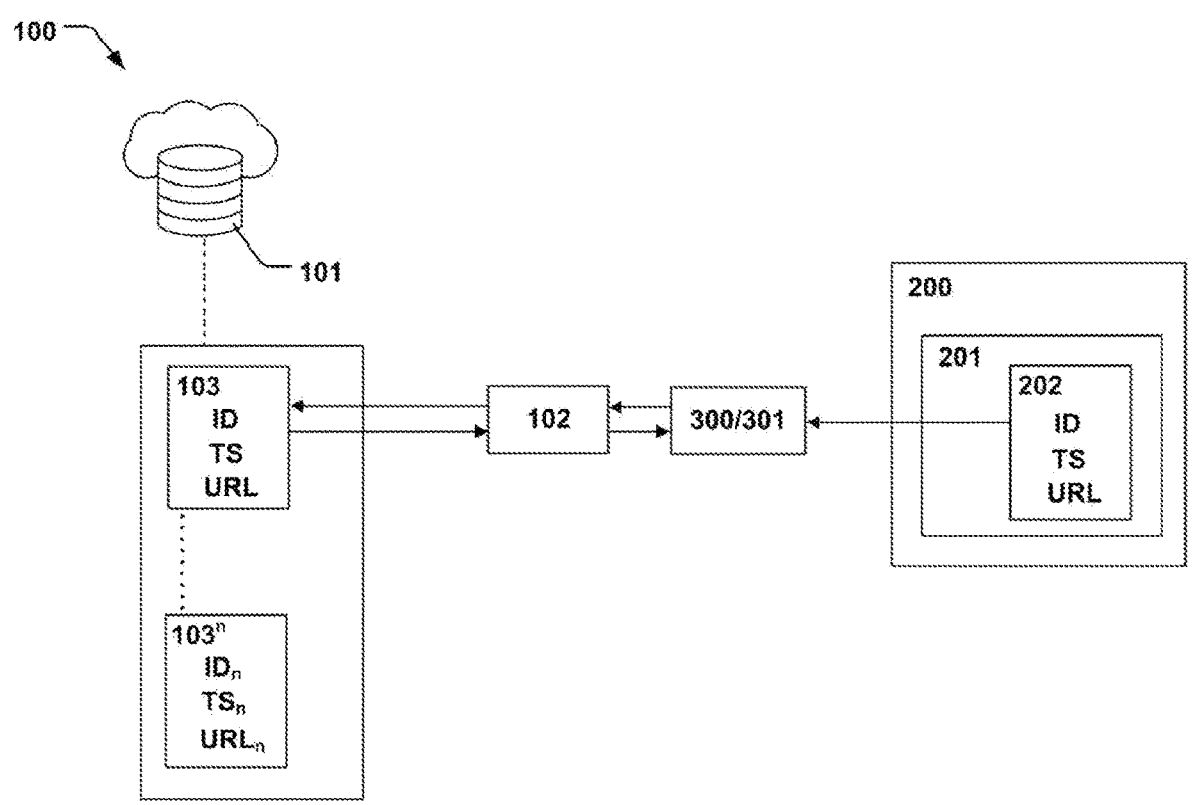

Having the tag URL generated based on the tag ID provides for further validation of the asset 200. For example, as a user proceeds to validate the asset 200, the controller 102 may be configured to request reading the tag URL from the memory 202, such as by any of the user devices 300, 301, described above, and verify the tag URL against the tag ID stored on the memory 202 of the tag 201. The tag 201 is validated as being authentic if the tag URL matches the tag ID, e.g. as defined by the rule set by which the tag URL has been originally generated as described above in relation to FIG. 3a. FIG. 3c is a schematic illustration of the tag URL being read from the memory 202 and checked against the tag record 103 for the particular tag 201 and its associated tag ID. It is conceivable however that in one example the tag URL which is read from the memory 202 of the tag 201 is checked directly against the tag ID which is also stored on the memory 202 of the tag 201, without having to cross-check with the tag record 103. As the tag URL has been validated as authentic the controller 102 may be configured to proceed further with the authentication of the tag 201 by comparing the token (TS) stored on the memory 202 with the token (TS) stored on the tag record 103 for the particular tag 201, as described above in relation to FIGS. 2a-c. This provides for a particularly efficient and robust validation of the asset 200.

The controller 102 may be configured to direct the user device 301 to the tag URL upon having determined that the asset 200 is authentic. For example, once a user has scanned the tag 201 with the user device 301, such as by a mobile phone, and the asset 200 has been determined as being authentic based on the validation of the token (TS) as described above in relation to FIGS. 2a-c, and in some examples in combination with the validation of the tag URL as described in relation to FIGS. 3a-c, the user may be directed to the URL as defined by the tag URL. Content on a connected server resource, such as the authentication server 101, associated with the URL may be downloaded on the user device 301. It is conceivable that the user is directed to an alternative URL informing the user that the asset 200 is not authentic if the authentication fails.

The controller 102 may be configured to associate user data of the user device 301 with the tag record 103 of the asset 200. This provides for managing and customizing the tag record 103 based on information provided by the user and/or by data collected from user device 301. For example, information provided to the user from the tag record 103 when scanning the tag 201 may be adapted to the geographical location of the user. Geographical information may be retrieved as user data, such as from positioning services and data from the user device when communicating over a mobile network. The controller 102 may be configured to direct the user device 301 to a tag URL where the data downloaded from the tag URL to the user device 301 is based on said user data. The producer of the asset 200 may provide tailored information to the user, e.g. where spare parts may be acquired or 3D printed in the vicinity of the user, or where the closest recycling facility is located. The manufacturer may in turn gain valuable insight in the consumer base, such as from demographic information provided via the user data.

Figure 4:
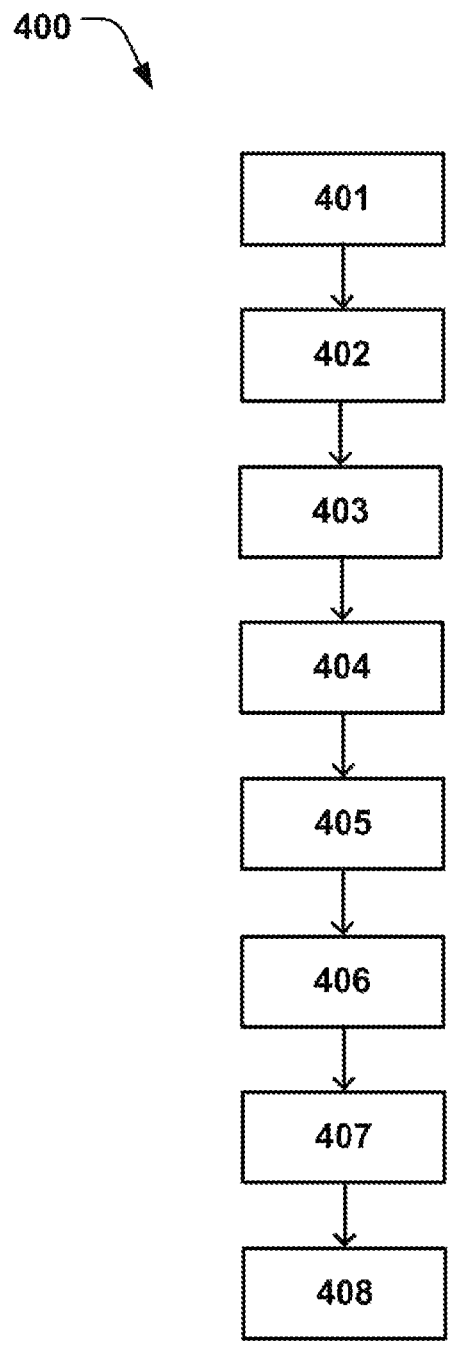
FIG. 4 is a flow chart of a method for authenticating an asset having an associated Near Field Communication (NFC) tag, according to an example.

FIG. 4 is a flowchart of a method 400 for authenticating an asset 200 having an associated NFC (Near Field Communication) tag 201. The method 400 comprises reading 401 a tag identification number (ID) from a memory 202 of the NFC tag 201, when an NFC connection is established between an NFC enabled device 300 and the NFC tag 201, and generating 402 a tag record 103 of the NFC tag 201 on an authentication server 101, associated with the tag ID. The method 400 comprises generating 403 a token (TS) corresponding to the NFC tag 201 based on the tag ID, and writing 404 of the token (TS) to the memory 202 of the of the NFC tag 201, when an NFC connection is established between the NFC enabled device 300 and the NFC tag 201. The method 400 comprises associating 405 the token (TS) with the tag ID in the tag record 103 of the NFC tag 201. Upon a user subsequently validating the asset 200, the method 400 comprises reading 406 the token (TS) from the memory 202, such as by the NFC enabled device 300 or a user device 301 configured for NFC read-only communication, and verifying 407 the token (TS) against the tag record 103 for the tag ID comprising comparing 408 said token (TS) with the associated token (TS) stored in said tag record 103 on the authentication server 101. The method 400 thus provides for the advantageous benefits as described above in relation to FIGS. 1-3. The method provides for an improved life cycle management of an asset 200, and a reliable and facilitated authentication of an asset 200.

A computer program product is provided comprising instructions which, when the program is executed by a computer, cause the computer to carry out the steps of the method 400.

The present disclosure has been described above with reference to specific examples. However, other examples than the above described are equally possible within the scope of the disclosure. The different features and steps of the disclosure may be combined in other combinations than those described. The scope of the disclosure is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

The invention claimed is:

1. An authentication system (100) for authenticating an asset (200) having an associated Near Field Communication (NFC) tag (201), the authentication system comprising;
an authentication server (101),
a controller (102) in communication with the authentication server and an NFC enabled device (300) configured to read and write data to a memory (202) of the NFC tag,
wherein the controller is configured to
request reading of a tag identification number (ID) from the memory of the NFC tag, when an NFC connection is established between the NFC enabled device and the NFC tag,
generate a tag record (103) of the NFC tag on the authentication server, associated with the tag ID,
generate a token (TS) corresponding to the NFC tag, wherein the token is generated by an algorithm (104) based on the tag ID,
request writing of the token to the memory of the of the NFC tag, when an NFC connection is established between the NFC enabled device and the NFC tag,
associate the token with the tag ID in the tag record of the NFC tag,
wherein, upon a user subsequently validating the asset, the controller is configured to request reading the token from the memory, such as by the NFC enabled device or a user device (301) configured for NFC read-only communication, and verify the token against the tag record for the tag ID comprising comparing said token with the associated token stored in said tag record on the authentication server.

2. Authentication system according to claim 1, wherein the controller is configured to determine that the asset is authentic if the token stored in the tag record for the tag ID is equivalent to the token stored in the memory of the NFC tag having said tag ID.

3. Authentication system according to claim 2, wherein the controller is configured to send a notification to the NFC enabled device and/or a user device that the asset is authentic or not authentic based on said determining.

4. Authentication system according to claim 1, wherein the controller is configured to generate a tag URL for the NFC tag based on the tag ID.

5. Authentication system according to claim 4, wherein the controller is configured to request writing of the tag URL to the memory of the NFC tag, when an NFC connection is established between the NFC enabled device and the NFC tag.

6. Authentication system according to claim 4, wherein the controller is configured to associate the tag URL with the tag record of the NFC tag.

7. Authentication system according to claim 4, wherein, upon a user subsequently validating the asset, the controller is configured to request reading the tag URL from the memory, such as by the user device, and verify the tag URL against the tag ID stored on the memory of the NFC tag.

8. Authentication system according to claim 2, wherein the controller is configured to generate a tag URL for the NFC tag based on the tag ID and wherein the controller is configured to direct the user device to the tag URL upon said determining the asset is authentic.

9. Authentication system according to claim 1, wherein the controller is configured to associate user data of the user device with the tag record of the asset.

10. Authentication system according to claim 9, wherein the controller is configured to direct the user device to the tag URL, wherein data downloaded from the tag URL to the user device is based on the user data.

11. Authentication system according to claim 1, wherein the token comprises at least 32 characters.

12. Authentication system according to claim 1, wherein the NFC enabled device and/or a user device is an NFC enabled smartphone or tablet.

13. Authentication system according to claim 1, wherein the asset is a 3D printed device with the NFC tag embedded in the printed material of the asset.

14. A method (400) for authenticating an asset (200) having an associated Near Field Communication (NFC) tag (201), the method comprising;
  reading (401) a tag identification number (ID) from a memory (202) of a Near Field Communication (NFC) tag (201), when an NFC connection is established between an NFC enabled device (300) and the NFC tag,
  generating (402) a tag record (103) of the NFC tag on an authentication server (101), associated with the tag ID,
  generating (403) a token (TS) corresponding to the NFC tag based on the tag ID,
  writing (404) of the token to the memory of the of the NFC tag, when an NFC connection is established between the NFC enabled device and the NFC tag,
  associating (405) the token with the tag ID in the tag record of the NFC tag,
  wherein, upon a user subsequently validating the asset, the method comprises
  reading (406) the token from the memory, such as by the NFC enabled device or a user device (301) configured for NFC read-only communication, and verifying (407) the token against the tag record for the tag ID comprising comparing (408) said token with the associated token stored in said tag record on the authentication server.

15. A non-transitory storage medium comprising a computer program product comprising instructions which, when the program is executed by a computer, causes the computer to carry out the steps
  reading (401) a tag identification number (ID) from a memory (202) of a Near Field Communication (NFC) tag (201), when an NFC connection is established between an NFC enabled device (300) and the NFC tag,
  generating (402) a tag record (103) of the NFC tag on an authentication server (101), associated with the tag ID,
  generating (403) a token (TS) corresponding to the NFC tag based on the tag ID,
  writing (404) of the token to the memory of the of the NFC tag, when an NFC connection is established between the NFC enabled device and the NFC tag,
  associating (405) the token with the tag ID in the tag record of the NFC tag,
  wherein, upon a user subsequently validating the asset, the method comprises
  reading (406) the token from the memory, such as by the NFC enabled device or a user device (301) configured for NFC read-only communication, and verifying (407) the token against the tag record for the tag ID comprising comparing (408) said token with the associated token stored in said tag record on the authentication server.

* * * * *